United States Patent
Li et al.

(10) Patent No.: US 11,182,906 B2
(45) Date of Patent: Nov. 23, 2021

(54) STREAM OBJECT TRACKING WITH DELAYED OBJECT DETECTION

(71) Applicant: International Business Machines Corporation, Armonk, NY (US)

(72) Inventors: Yubo Li, Beijing (CN); Qing Wang, Beijing (CN); Ke Jin, Beijing (CN); Shi Lei Zhang, Beijing (CN); Jie Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/693,319

(22) Filed: Nov. 24, 2019

(65) Prior Publication Data
US 2021/0158536 A1     May 27, 2021

(51) Int. Cl.
*G06K 9/00*   (2006.01)
*G06T 7/20*   (2017.01)
*G06T 7/70*   (2017.01)

(52) U.S. Cl.
CPC .......... *G06T 7/20* (2013.01); *G06K 9/00744* (2013.01); *G06T 7/70* (2017.01); *G06T 2207/10016* (2013.01); *G06T 2207/20084* (2013.01)

(58) Field of Classification Search
CPC .................................................. G06K 9/00744
See application file for complete search history.

(56) References Cited

U.S. PATENT DOCUMENTS

| | | | | |
|---|---|---|---|---|
| 10,304,238 | B2* | 5/2019 | Cooper | G06T 19/006 |
| 2004/0096198 | A1* | 5/2004 | Lee | H04N 19/99 |
| | | | | 386/329 |
| 2005/0228849 | A1* | 10/2005 | Zhang | G06F 16/739 |
| | | | | 709/200 |
| 2015/0178931 | A1* | 6/2015 | Gao | G06F 16/35 |
| | | | | 382/103 |

(Continued)

FOREIGN PATENT DOCUMENTS

| | | |
|---|---|---|
| CN | 104517275 A | 4/2015 |
| CN | 107680100 A | 2/2018 |

(Continued)

OTHER PUBLICATIONS

Pairo, W., Loncomilla, P. & del Solar, J.R. A Delay-Free and Robust Object Tracking Approach for Robotics Applications. J Intell Robot Syst 95, 99-117 (2019). https://doi.org/10.1007/s10846-018-0840-6 (Year: 2018).*

(Continued)

*Primary Examiner* — Hadi Akhavannik
(74) *Attorney, Agent, or Firm* — David B. Woycechowsky (57) ABSTRACT

Technology for performing object tracking of an object in a video image using both object detection algorithm and an object tracking algorithm. Because object detection algorithms are generally slower, but accurate, than object tracking algorithms, only certain sampled video frames are subject to the object detection algorithm. The non-sampled frames locate the object using the object tracking algorithm, using the most recent previous object detected frame as a starting frame. In this way, the object detection algorithm is used to periodically, effectively calibrate the object tracking algorithm by using a lagging detection result to hide latency introduced by the object detection algorithm.

18 Claims, 8 Drawing Sheets

(56) References Cited

U.S. PATENT DOCUMENTS

| | | | |
|---|---|---|---|
| 2016/0163064 A1* | 6/2016 | Ruf | G06T 7/20 382/103 |
| 2016/0343145 A1 | 11/2016 | Israel | |
| 2018/0211396 A1* | 7/2018 | Roshtkhari Javan | G06T 7/277 |
| 2019/0114804 A1 | 4/2019 | Sundaresan | |
| 2019/0130580 A1* | 5/2019 | Chen | G06K 9/2054 |

FOREIGN PATENT DOCUMENTS

| | | |
|---|---|---|
| CN | 107798272 A | 3/2018 |
| CN | 109871763 A | 6/2019 |
| CN | 110458861 A | 11/2019 |

OTHER PUBLICATIONS

G, Chandan et al., "Real Time Object Detection and Tracking Using Deep Learning and OpenCV", Proceedings of the International Conference on Inventive Research in Computing Applications (ICIRCA 2018), IEEE Xplore Compliant Part No. CFP18N67-ART; ISBN:978-1-5386-2456-2, 4 pages.

Kumar et al., "Pack and Detect: Fast Object Detection in Videos Using Region-of-Interest Packing", CODS-COMAD'19, Jan. 2019, Kolkata, India, <https://doi.org/10.1145/3297001.3297020>, 7 pages.

Mao et al., "CATDET: Cascaded Tracked Detector for Efficient Object Detection From Video", arXiv:1810.00434v2 [cs.CV] Feb. 19, 2019, 11 pages.

Pairo et al., "A Delay-Free and Robust Object Tracking Approach for Robotics Applications", Journal of Intelligent & Robotic Systems, 2 pages, Received: Jul. 6, 2017 / Accepted: Apr. 10, 2018, © Springer Science+Business Media B.V., part of Springer Nature 2018, Published online: May 7, 2018, <https://doi.org/10.1007/s10846-018-0840-6>.

Park et al., "Extended Keyframe Detection with Stable Tracking for Multiple 3D Object Tracking", IEEE Transactions on Visualization and Computer Graphics, vol. 17, No. 11, Nov. 2011, pp. 1728-1735.

International Search Report and Written Opinion, International Application No. PCT/IB2020/060020, International Filing Date Oct. 26, 2020, 10 pages.

* cited by examiner

| | DETECTION ONLY (OD ON PowerAI VISION) | TRACKING BY DELAYED DETECTION |
|---|---|---|
| FPS PER GPU (P100) PER CPU | ~13 | ~30 (AVG. 3 OBJECTS) |
| CONCURRENT LIVE STREAMS (25FPS) PER GPU | ~0.5 | ~4 (1/8 FRAME SAMPLE FOR DETECTION) |
| OBJECT IDENTIFICATION | NO | YES |

STREAM OBJECT TRACKING WITH DELAYED OBJECT DETECTION

BACKGROUND

The present invention relates generally to the field of machine logic for object tracking and machine logic for object detection.

It is known that computer systems can perform "object detection" (herein referred to as object detection systems. Object detection systems typically include a graphics processing unit (GPU). Object detection is a computer technology related to computer vision and image processing that deals with detecting occurrences of "semantic objects" of a certain pre-defined class (such as humans, buildings, or cars) in digital images (for example, videos). Some domains of object detection include pedestrian detection. Object detection has applications in many areas of computer vision, including image retrieval and video surveillance. It is used in computer vision tasks, such as video object co-segmentation. It is also used in conjunction with "object tracking" (discussed below in the following paragraph). Every object class has its own special features that helps in classifying the class. For example, all circles are round. Object class detection uses these special features. Conventional object detection typically uses a machine learning-based approach or a deep learning-based approach. For machine learning type object detection, it is necessary to first define features using one of the methods, enumerated below, and then using a technique such as support vector machine (SVM) to do the classification. Deep learning type object detection that are able to do end-to-end object detection without specifically defining features, and are typically based on convolutional neural networks (CNN). The different types of machine learning approaches, mentioned above, include: (i) Viola-Jones object detection framework based on Haar features; (ii) scale-invariant feature transform (SIFT); and/or (iii) histogram of oriented gradients (HOG) features. Different types of deep learning approaches include: (i) Region Proposals (R-CNN, Fast R-CNN, Faster R-CNN); (ii) Single Shot MultiBox Detector; and (iii) You Only Look Once (YOLO).

It is known that computer systems can perform "object tracking" (herein referred to as object tracking systems) by object tracker software that runs on a central processing unit (CPU). Object tracking is also sometimes referred to as "video tracking." The Wikipedia entry for the term video tracking, as of 14 Aug. 2019 states as follows: "Video tracking is the process of locating a moving object (or multiple objects) over time using a camera. It has a variety of uses, some of which are: human-computer interaction, security and surveillance, video communication and compression, augmented reality, traffic control, medical imaging and video editing. Video tracking can be a time consuming process due to the amount of data that is contained in video. Adding further to the complexity is the possible need to use object recognition techniques for tracking, a challenging problem in its own right . . . . An example of visual servoing for the robot hand to catch a ball by object tracking with visual feedback that is processed by a high-speed image processing system. The objective of video tracking is to associate target objects in consecutive video frames. The association can be especially difficult when the objects are moving fast relative to the frame rate. Another situation that increases the complexity of the problem is when the tracked object changes orientation over time. For these situations video tracking systems usually employ a motion model which describes how the image of the target might change for different possible motions of the object."

An article entitled "Extended Keyframe Detection with Stable Tracking for Multiple 3D Object Tracking" appearing in IEEE TRANSACTIONS ON VISUALIZATION AND COMPUTER GRAPHICS, volume 17, number 11, November 2011 (the "Park et al. Article") discloses as follows: "We now explain our stable tracking algorithm that combines object detection and frame-by-frame tracking. Frame-by-frame tracking has two purposes: it completes detection to track the object whenever it is present, and it stabilizes the estimated pose, removing the jittering effect that detection alone would produce. We extract feature points in each input frame and match them against those extracted in the previous frame using standard techniques based on cross-correlation and local search. Compared to the KLT tracker, it allows us to easily handle appearing and disappearing feature points, and to prevent drift of the tracked locations. We call these feature points 'temporal keypoints.'"

SUMMARY

According to an aspect of the present invention, there is a method, computer program product and/or system that performs the following operations (not necessarily in the following order): (i) receiving an ordered and time sequential plurality of video frames from a video image that includes a moving object; (ii) sampling a plurality of selected video frames of the plurality of video frames so that one (1) of every N frames is a selected video frame, where N is an integer greater than one (1); (iii) performing an object detection algorithm on the plurality of selected video frames to locate the moving object in each of the selected video frames and to obtain respective object locations for each selected video frame of the plurality of video frames to obtain sampled frame object locations for the moving object; and (iv) performing object tracking on the plurality of video frames to locate the moving object in each of the video frames to obtain object tracking locations for the moving object, with the object tracking including: (a) for each given selected video frame of the plurality of video frames, using the sampled frame object location as the object tracking location for the given selected video frame, (b) for each given video frame that is not a selected video frame of the plurality of video frames, applying an object tracking algorithm using the most recent previous sampled frame object location as a start frame in the object tracking algorithm to obtain the object tracking location for the given video frame that is not a selected frame so that the sampled frame object locations serve to calibrate the object tracking locations for video frames that are not selected video frames, and (c) hiding a detection latency associated with the performance of the object detection algorithm on the plurality of selected video frames.

According to an aspect of the present invention, there is a method, computer program product and/or system that performs the following operations (not necessarily in the following order): (i) receiving an ordered and time sequential plurality of video frames from a video image that includes a moving object; (ii) sampling a plurality of selected video frames of the plurality of video frames so that one (1) of every N frames is a selected video frame, where N is an integer greater than one (1); (iii) performing a Convolutional Neural Network (CNN) object detection algorithm on the plurality of selected video frames to locate the moving object in each of the selected video frames and to obtain respective object locations for each selected video frame of the plurality of video frames to obtain sampled frame object locations for the moving object; and (iv) performing object tracking on the plurality of video frames to locate the moving object in each of the video frames to obtain object tracking locations for the moving object, with the object tracking including: (a) for each given selected video frame of the plurality of video frames, using the sampled frame object location as the object tracking location for the given selected video frame, (b) for each given video frame that is not a selected video frame of the plurality of video frames, applying an object tracking algorithm using the most recent previous sampled frame object location as a start frame in the object tracking algorithm to obtain the object tracking location for the given video frame that is not a selected frame so that the sampled frame object locations serve to calibrate the object tracking locations for video frames that are not selected video frames, and (c) hiding a detection latency associated with the performance of the object detection algorithm on the plurality of selected video frames.

According to an aspect of the present invention, there is a method, computer program product and/or system that performs the following operations (not necessarily in the following order): (i) receiving an ordered and time sequential plurality of video frames from a video image that includes a moving object; (ii) sampling a plurality of selected video frames of the plurality of video frames so that one (1) of every N frames is a selected video frame, where N is an integer greater than one (1); (iii) performing an object detection algorithm on the plurality of selected video frames to locate the moving object in each of the selected video frames and to obtain respective object locations for each selected video frame of the plurality of video frames to obtain sampled frame object locations for the moving object; and (iv) performing Kernelized Correlation Filter (KCF) object tracking on the plurality of video frames to locate the moving object in each of the video frames to obtain object tracking locations for the moving object, with the object tracking including: (a) for each given selected video frame of the plurality of video frames, using the sampled frame object location as the object tracking location for the given selected video frame, (b) for each given video frame that is not a selected video frame of the plurality of video frames, applying an object tracking algorithm using the most recent previous sampled frame object location as a start frame in the object tracking algorithm to obtain the object tracking location for the given video frame that is not a selected frame so that the sampled frame object locations serve to calibrate the object tracking locations for video frames that are not selected video frames, and (c) hiding a detection latency associated with the performance of the object detection algorithm on the plurality of selected video frames.

DETAILED DESCRIPTION

Some embodiments of the present invention are directed to performing object tracking of an object in a video image using both object detection algorithm and an object tracking algorithm. Because object detection algorithms are generally slower, but accurate, than object tracking algorithms, only certain sampled video frames are subject to the object detection algorithm. The non-sampled frames locate the object using the object tracking algorithm, using the most recent previous object detected frame as a starting frame. In this way, the object detection algorithm is used to periodically, effectively calibrate the object tracking algorithm while using a lagging detection result to hide latency introduced by the object detection algorithm. This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
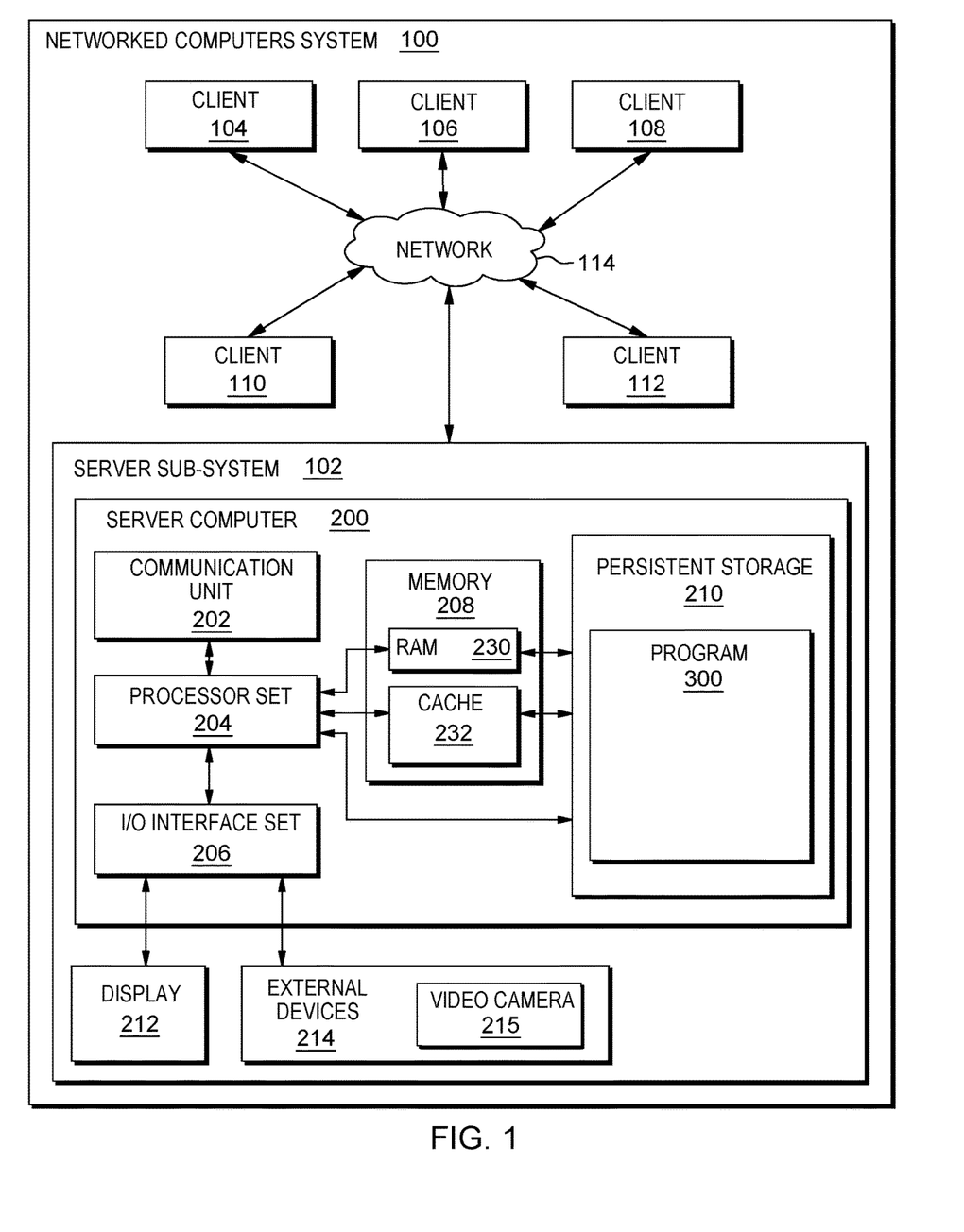
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; video camera 215; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2A:
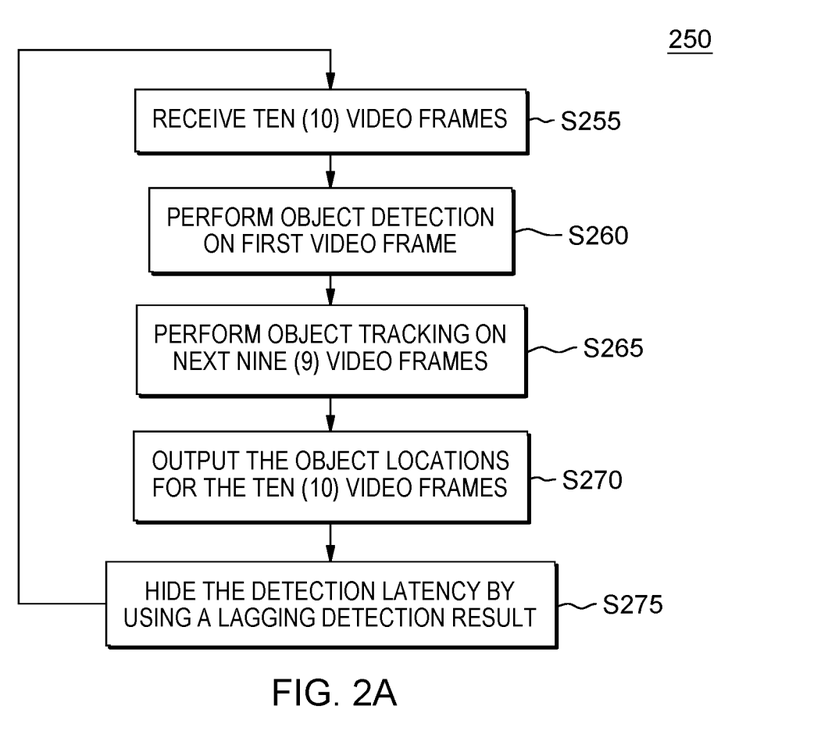
FIG. 2A is a flowchart showing a first embodiment method performed, at least in part, by the first embodiment system.
Figure 3:
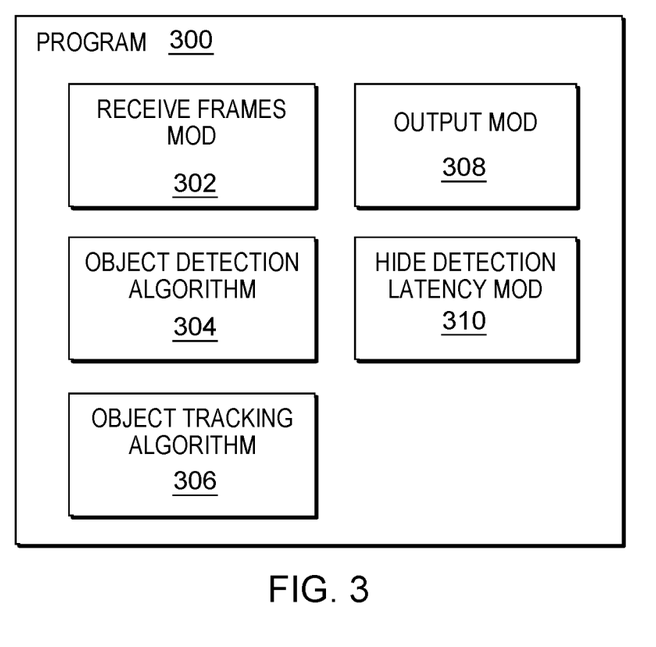
FIG. 3 is a block diagram showing a machine logic (for example, software) portion of the first embodiment system.

As shown in FIG. 1, networked computers system 100 is an environment in which an example method according to the present invention can be performed. As shown in FIG. 2A, flowchart 250 shows an example method according to the present invention. As shown in FIG. 3, program 300 performs or controls the performance of at least some of the method operations of flowchart 250. This method and associated software will now be discussed, over the course of the following paragraphs, with extensive reference to the blocks of FIGS. 1, 2A and 3.

Figure 4A:
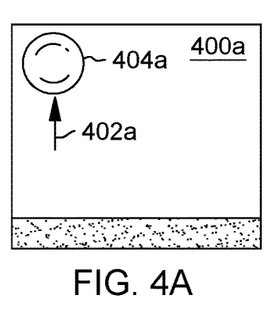
FIGS. 4A-4J are video frames and associated video overlays generated by the first embodiment system.
Figure 4B:
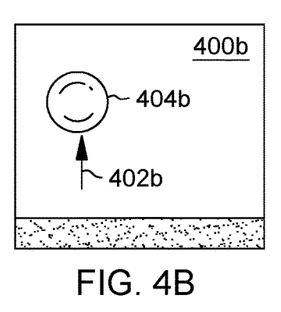
Figure 4C:
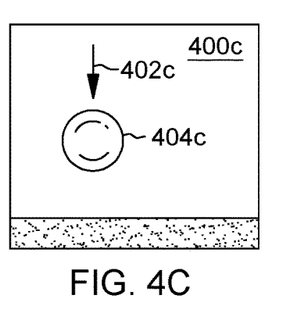
Figure 4D:
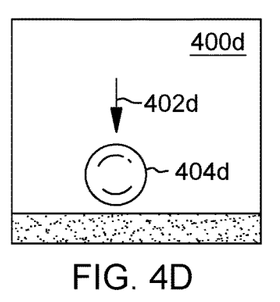
Figure 4E:
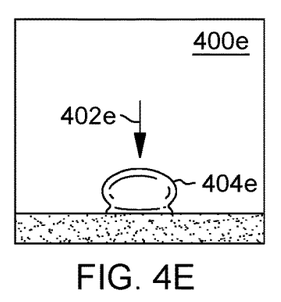
Figure 4F:
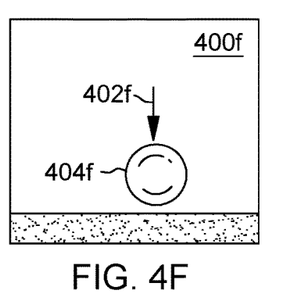
Figure 4G:
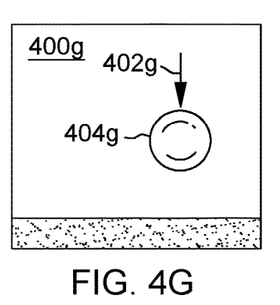
Figure 4H:
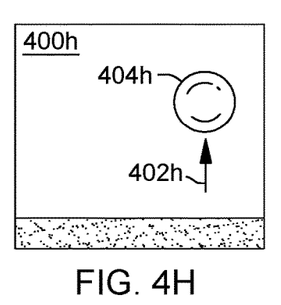
Figure 4I:
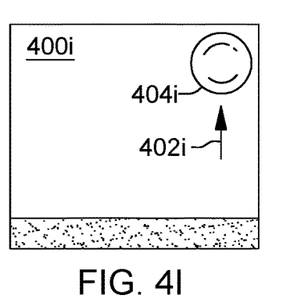
Figure 4J:
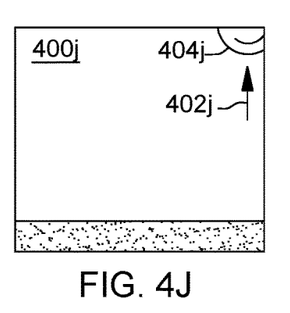

Processing begins at operation S255, where video camera 215 of external device set 214 is continuously feeding video frames to receive frames module ("mod") 302. Ten of these frames are shown at video frames 400a,b,c,d,e,f,g,h,i,j of FIGS. 4A,B,C,D,E,F,G,H,I,J, respectively. In this example, video frames are captured at a rate of 60 frames per second. This example will focus on ten (10) video frames 400a,b,c,d,e,f,g,h,i,j.

Processing proceeds to operation S260, where the first video frame of each sequential set of ten (10) video frames is sampled and has object detection algorithm 304 performed upon it. Alternatively, other sampling rates could be used for determining how often a frame is sampled (or selected) for application of object detection algorithm 304. In this example, the first of the set of ten (10) sequential frames is frame 400a of FIG. 4A. In this example, the detected object is a flying/bouncing ball that appears as ball 404a in frame 400a. By detecting ball 404a, object detection algorithm 304 detects the location of ball 404a as indicated by superimposed arrow 402a in frame 400a.

Processing proceeds to operation S265, where the next nine (9) video frames 400b,c,d,e,f,g,h,i,j have object tracking algorithm 306 applied to them. During the application of the object tracking algorithm, the ball location as determined by object detection algorithm is used as a starting location for the object tracking algorithm. In this way the starting position is periodically calibrated every ⅙ of a second by the use of the results of the object detection algorithm at operation S260. The location of the ball 404b,c,d,e,f,g,h,i,j for these subsequent nine (9) frames is indicated by superimposed arrows 402b,c,d,e,f,g,h,i,j of FIGS. 4B,C,D,E,F,G, H,I,J, respectively.

Processing proceeds to operation S270, where output 308 outputs the ten (10) frames 400a,b,c,d,e,f,g,h,i,j with superimposed arrows 402a,b,c,d,e,f,g,h,i,j that indicate the determined locations of the ball in each respective frame by algorithms 304 and 306 (as applicable). These ten (10) frames are output to hide latency mod 310.

Processing proceeds to operation S275, where hide latency mod 310 hides the detection latency imparted by use of an object detection algorithm, which is slow relative to the object tracking algorithm. More specifically, mod 310 hides the detection latency by using a lagging detection result. Mod 310 outputs the ten (10) frames 400a,b,c,d,e,f, g,h,i,j, in sequential order, through communication network 114 to client subsystems 104, 106, 108, 110 and 112. As shown in flowchart 250, after operation S275, processing loops back around to operation S255 for processing of the next ten (10) video frames.

Figure 2B:
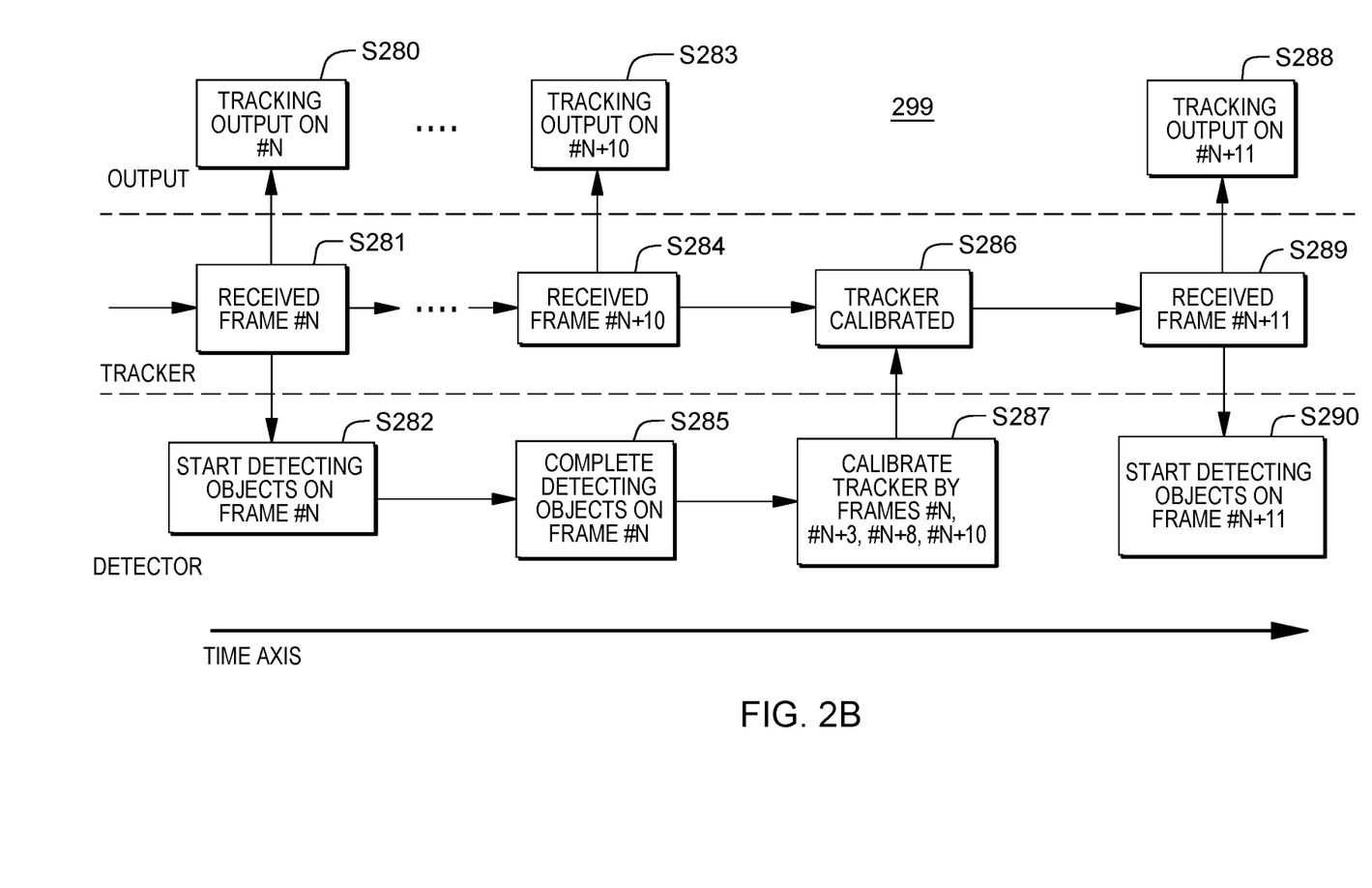
FIG. 2B is a supplemental flowchart with respect to the flowchart of FIG. 2A that shows operations and timing of operations at a more granular level.

It is noted that the preceding discussion discusses the method of flowchart 250 at a relatively general level and may be somewhat misleading about detection latency hidden absent further explanation at a more granular level. This further explanation will now be provided with reference to flowchart 299 of FIG. 2B, which includes the following operations (with process flow among and between the operations being as shown in FIG. 2B): S280; S281; S282; S283; S284; S285; S286; S287; S288; S289; and S290.

As can be seen in flowchart 299, in this example, object detection is only performed on every eleventh (11$^{th}$) frame of the video signal. While object detection (a relatively time consuming process) is performed on a frame (that is, frame N in the example of flowchart 299), object tracking is performed on eleven frames (that is, frame N and frames N+1 to N+10). This is shown at operations S280, S282, S283 and S285 of flowchart 299. After the object detection has been completed (see operation S285), the object tracker is calibrated using the object detection results (that is, in the is example, the object detection results for frame N). This calibration is shown at operations S286 and S287. By performing objection detection and associated tracker calibration intermittently (for example, periodically, once every X frames) and simultaneously performing object tracking continuously on every frame, detection latency is hidden. While this example performs object detection every eleventh frame, other periods can be used. Alternatively, object detection may be performed intermittently at variable increments of frames (for example, embodiments where frequency of object detection depends upon number of tracked objects or complexity of the video image). Also, while the example of flowchart 299 uses frames N+3, N+8 and N+10 in calibration, alternatively, different amounts of non-object-detected frames can be used in the calibration operation.

III. Further Comments and/or Embodiments

Some embodiments of the present invention recognize the following facts, potential problems and/or potential areas for improvement with respect to the current state of the art: (i) object detection and object tracking are different things; (ii) object detection is typically characterized by the following characteristics: (a) too slow to process live video; (b) faster-rcnn object detection on PowerAI Vision can only achieve ~13 fps (frames per second) even on powerful P100 GPU (graphics processing unit), (b) difficult to process live video with 25 fps, (c) very cost expensive (2 P100 GPU can support 1 live stream), and (d) delayed output due to detection latency; (iii) traditional object tracking is typically characterized by the following characteristics: (a) unsupervised and auto-identification with single start frame and bounding box, (b) fast-speed (in other words, KCF (kernelized correlation filters) can achieve ~200FPS on a CPU (central processing unit)), and (c) error-propagation on long-term; and/or (iv) existing detection and tracking fusion work is tracking by detection, that is, tracking by matching detected objects (for example, bbox, features, etc.).

Figure 5:
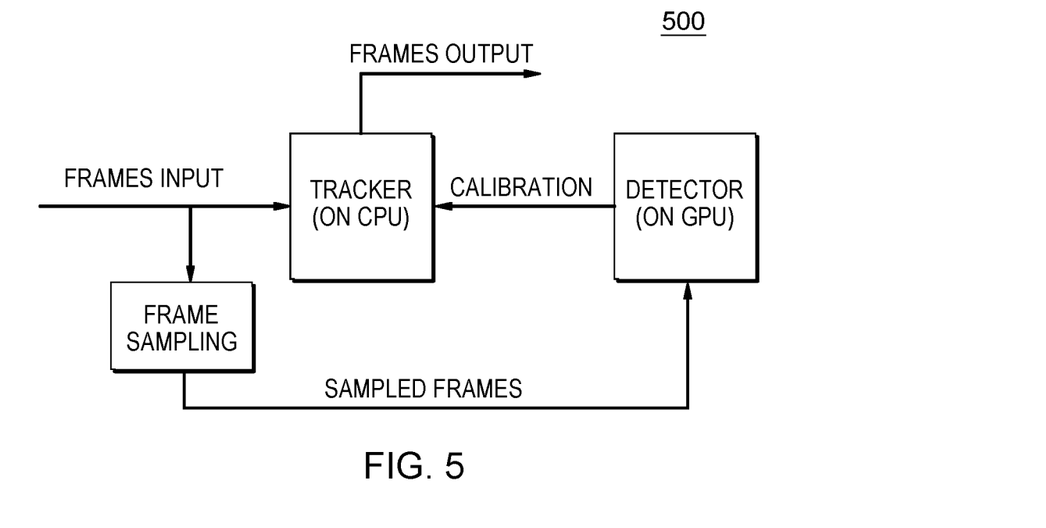
FIG. 5 is a block diagram of a second embodiment of a system according to the present invention.
Figure 6:
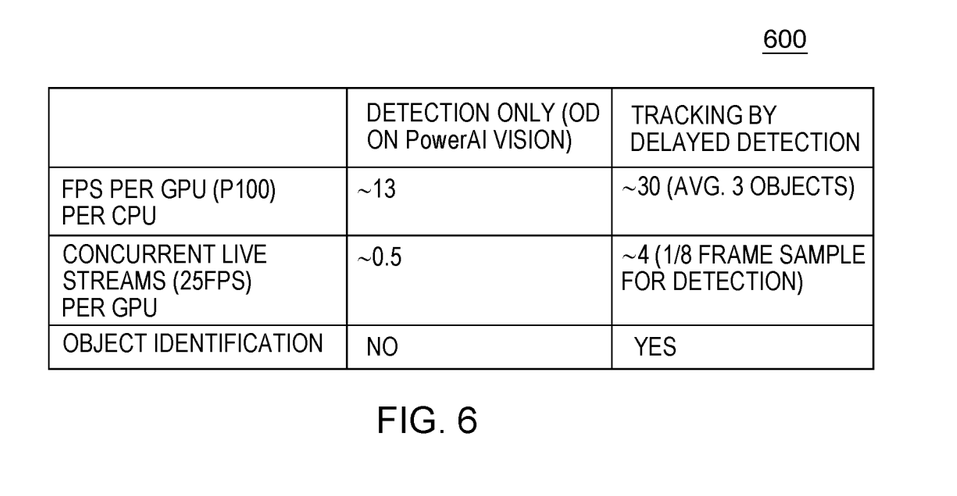
FIG. 6 is a table helpful in understanding various embodiments of the present invention.
Figure 7:
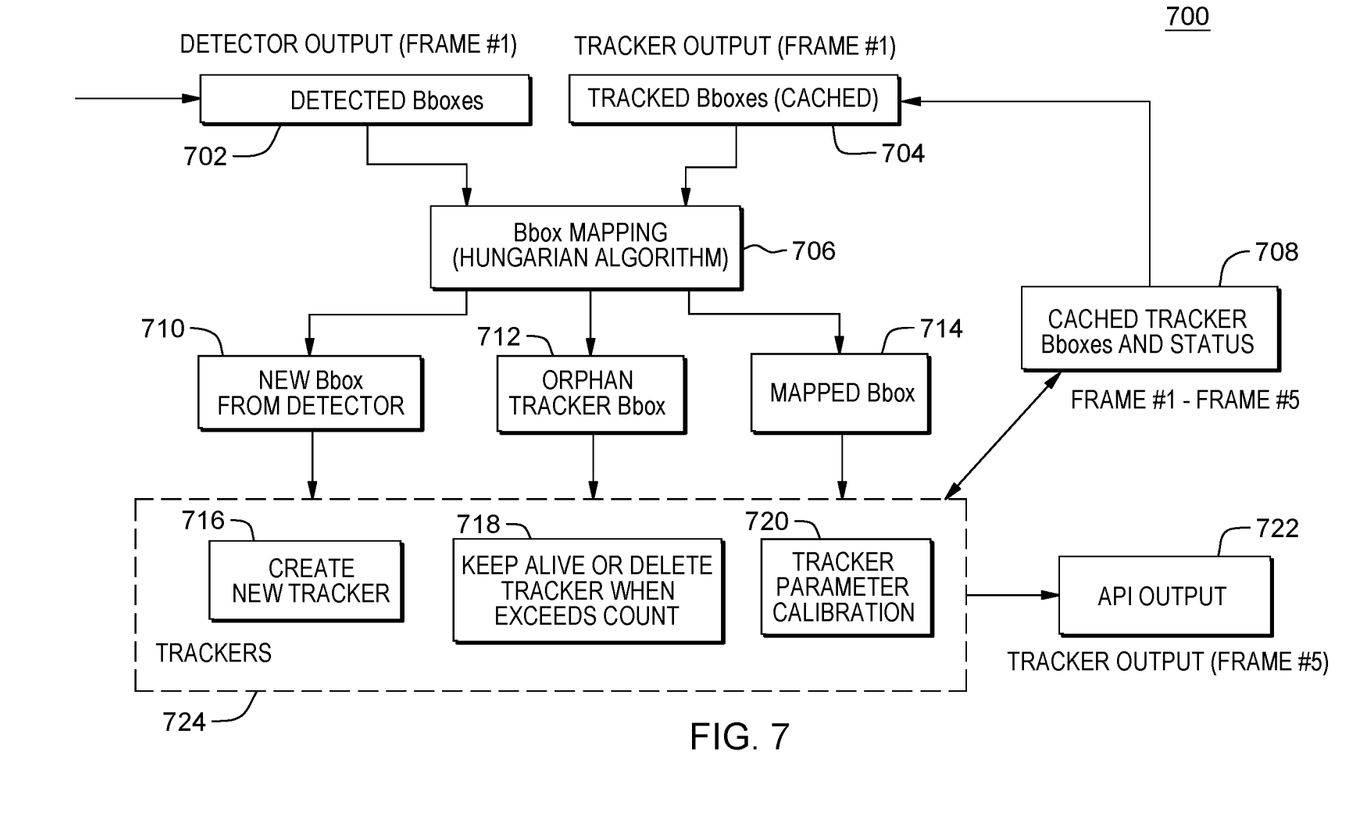
FIG. 7 is a block diagram showing data flow according to an embodiment of the present invention.

As shown in FIG. 5, frame flow diagram 500 shows an embodiment of the present invention. This embodiment includes the following features, characteristics, operations and/or advantages: (i) performs object tracking by delayed detection; (ii) object detector detects sampled frames and its output is used to calibrate object tracker; and (iii) object tracker processes continuous frames and outputs directly; and (iv) improves video processing throughput, reduce latency, and reduce GPU workload. As shown in FIG. 6, table 600 shows features related to detection and tracking data for frames and object identification. As shown in FIG. 7, tracker update workflow diagram 700 includes the following: detected bboxes block 702; cached tracked bboxes block 704; bbox mapping block 706; cached tracker bboxes and status block 708; new bbox from detector block 710; orphan tracker bbox block 712; mapped bbox block 714; create new tracker block 716; keep alive/delete tracker block 718; tracker parameter calibration block 720; API output block 722; and trackers block 724.

Figure 8:
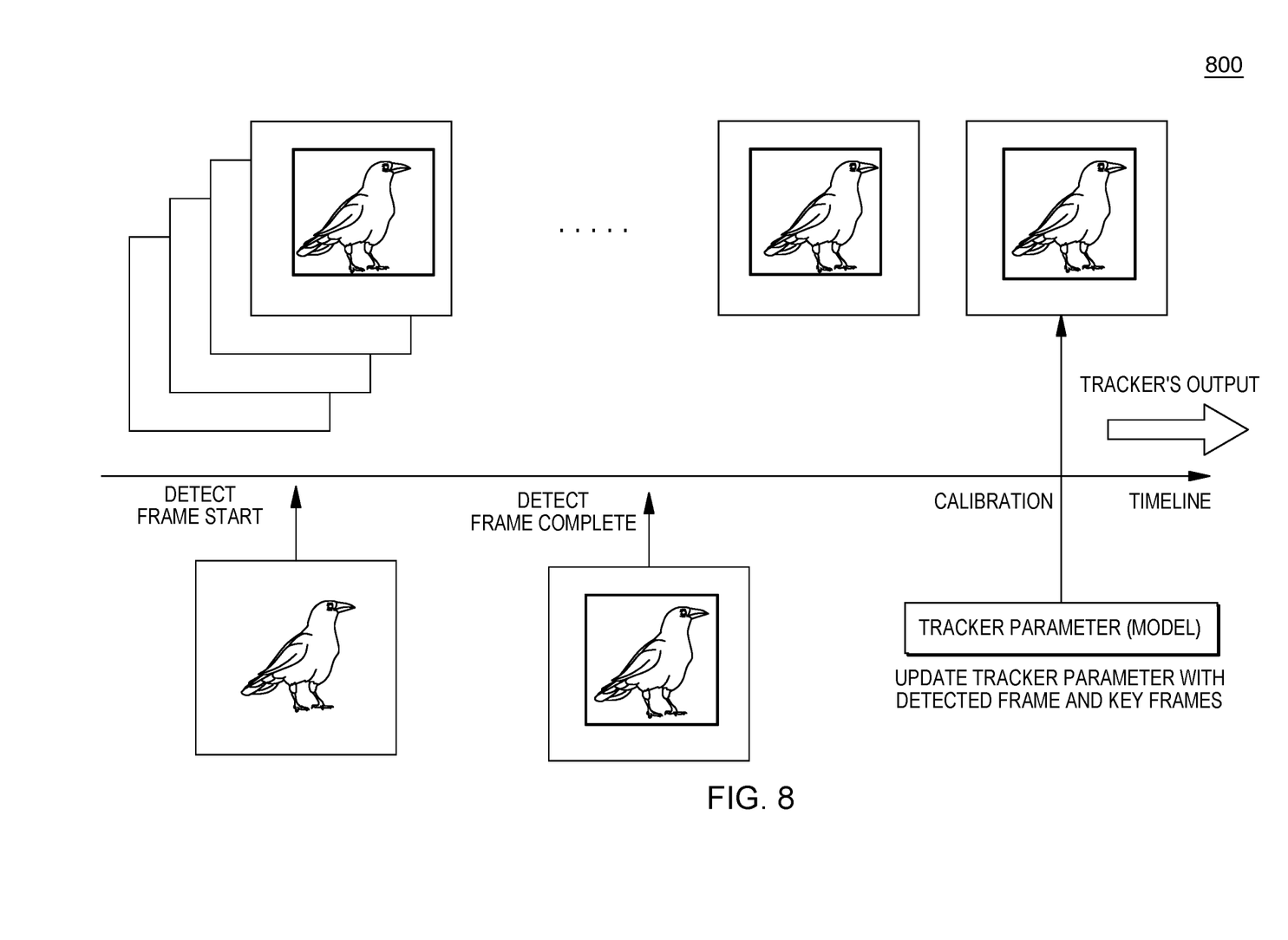
FIG. 8 is a timeline view of a third embodiment of a method according to the present invention.

As shown in FIG. 8, tracker parameter calibration diagram 800 has the following features: (i) both detected frame and key frames are used to calibrate tracker parameter; (ii) key frame is the frame that with relatively large change between 2 frames; (iii) parameter calibration includes detected frame and uses detected ROI (region of interest, also sometimes referred to as bounding box or bbox) to train tracker's parameter directly while ignoring tracker's bbox output; and (iv) parameter calibration includes key frame: self-training with both parameter update and bbox output update.

Some embodiments of the present invention may include one, or more, of the following operations, features, characteristics and/or advantages: (i) apparatus of tracking by delayed detection framework; (ii) tracker updates workflow; and/or (iii) key-frame based tracker parameter calibration by detection results.

Some potential applications of the present invention may include the following: (i) artificial intelligence vision by accelerating object detection speed and response, prototype done; and (ii) tracking of sports players during sports contests.

Some embodiments of the present invention may include one, or more, of the following operations, features, characteristics and/or advantages: (i) accurate, auto-calibrated, real-time tracking; (ii) leveraging of delayed object detection for tracker auto-calibration; (iii) tracking by delayed detection apparatus, in which tracker module accepts input frames and directly makes output, while sampled frames are fed into object detection module; (iv) the output is used to calibrate the tracker; (v) tracker update workflow with delayed detection output; and/or (vi) key frame based tracker calibration.

Some embodiments of the present invention may include one, or more, of the following operations, features, characteristics and/or advantages: (i) object tracking takes advantages of both object detection and traditional object tracking algorithms; (ii) latency is not dependent on a detection algorithm; (iii) more complicated but high accuracy object detection CNN (convolutional neural network) to improve the overall accuracy can be used; (iv) "key frame" to accelerate object tracking is used with different object tracking; (v) delayed object detection results can be used to calibrate tracking result in order to achieve real-time tracking; (vi) object detection and tracking is not in a sequence; (vii) key-frame based calibration method is used to accelerate tracking; (viii) specific estimation algorithm like KLT (Kanade-Lucas-Tomasi) are not relied on; (ix) all traditional tracking algorithms, such as KCF (Kernelized Correlation Filter), can be applied to estimate current tracking location by key-frame based tracker calibration; (x) a system diagram is used to show the algorithm works in a real video recognition system; (xi) utilizes one detector and one tracker where the tracker's output will not feedback to the detector, but directly as system output; (xii) focus on read-time problem tracking; and/or (xiii) focuses on the combination of object detection and object tracking for real-time system.

Some embodiments of the present invention may include one, or more, of the following operations, features, characteristics and/or advantages: (i) hide detection latency; (ii) uses tracker's output as system output; (iii) uses lagging detected result and keyframe based mechanism to update the tracker's parameter; (iv) do not wait for a detection result; (v) keyframes are used to accelerate the tracker's parameter updating; (vi) the keyframes guide the tracker to make a more accurate output prediction of the object location, rather than using keyframes to reduce detection frequency; and/or (vii) may use KCF as the object tracking algorithm; (viii) can be used with tracking algorithms other than KCF.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above —similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving an ordered and time sequential plurality of video frames from a video image that includes a moving object;
performing object detection on the plurality of video frames to determine an identification of the moving object;
during the performance of object detection, performing object tracking calibration on the plurality of video frames with respect to the moving object using bounding boxes and key frames present in the plurality of video frames; and
during the performance of object detection and subsequent to the performance of object tracking calibration, performing object tracking to locate the moving object in at least some of the video frames to obtain object tracking locations for the moving object;
wherein the performance of object tracking calibration and object tracking during a period of object detection results in a lagging detection result hiding a detection latency associated with the performance of object detection on the plurality of video frames.

2. The CIM of claim 1 further comprising:
performing artificial intelligence vision with accelerated object detection speed due to the hiding of the detection latency by use of the lagging detection result.

3. The CIM of claim 1 wherein:
the plurality of video games represents a sports contest; and
the moving object is player who moves about during the sports contest.

4. The CIM of claim 1 wherein:
the performance of object tracking calibration includes determining locations of the moving object by detecting the bounding boxes.

5. The CIM of claim 1 further comprising:
determining key frames of the plurality of video frames with the key frames being frames where a location change in a location of the moving object is relatively large;
wherein the performance of object detection includes applying an object detection algorithm on at least some of the video frames of the plurality of video frames to locate the moving object in within the video frames.

6. The CIM of claim 1 wherein a sampled frame object location, used as an object tracking location for a given video frame, is the lagging detection result.

7. A computer program product (CPP) comprising:
a set of storage device(s); and
computer code stored collectively in the set of storage device(s), with the computer code including data and instructions to cause a processor(s) set to perform at least the following operations:
receiving an ordered and time sequential plurality of video frames from a video image that includes a moving object, performing object detection on the plurality of video frames to determine an identification of the moving object, during the performance of object detection, performing object tracking calibration on the plurality of video frames with respect to the moving object using bounding boxes and key frames present in the plurality of video frames, and during the performance of object detection and subsequent to the performance of object tracking calibration, performing object tracking to locate the moving object in at least some of the video frames to obtain object tracking locations for the moving object, wherein the performance of object tracking calibration and object tracking during a period of object detection results in a lagging detection result hiding a detection latency associated with the performance of object detection on the plurality of video frames.

8. The CPP of claim 7 wherein the computer code further includes data and instructions for performing the following operation(s):

performing artificial intelligence vision with accelerated object detection speed due to the hiding of the detection latency by use of the lagging detection result.

9. The CPP of claim 7 wherein:

the plurality of video games represents a sports contest; and the moving object is player who moves about during the sports contest.

10. The CPP of claim 7 wherein:

the performance of object tracking calibration includes determining locations of the moving object by detecting the bounding boxes.

11. The CPP of claim 7 wherein the computer code further includes data and instructions for performing the following operation(s):

determining key frames of the plurality of video frames with the key frames being frames where a location change in a location of the moving object is relatively large;

wherein the performance of object detection includes applying an object detection algorithm on at least some of the video frames of the plurality of video frames to locate the moving object within the video frames.

12. The CPP of claim 7 wherein a sampled frame object location, used as an object tracking location for a given video frame, is the lagging detection result.

13. A computer system (CS) comprising:

a processor(s) set;

a set of storage device(s); and computer code stored collectively in the set of storage device(s), with the computer code including data and instructions to cause the processor(s) set to perform at least the following operations:

receiving an ordered and time sequential plurality of video frames from a video image that includes a moving object, performing object detection on the plurality of video frames to determine an identification of the moving object, during the performance of object detection, performing object tracking calibration on the plurality of video frames with respect to the moving object using bounding boxes and key frames present in the plurality of video frames, and during the performance of object detection and subsequent to the performance of object tracking calibration, performing object tracking to locate the moving object in at least some of the video frames to obtain object tracking locations for the moving object, wherein the performance of object tracking calibration and object tracking during a period of object detection results in a lagging detection result hiding a detection latency associated with the performance of object detection on the plurality of video frames.

14. The CS of claim 13 wherein the computer code further includes data and instructions for performing the following operation(s):

performing artificial intelligence vision with accelerated object detection speed due to the hiding of the detection latency by use of the lagging detection result.

15. The CS of claim 13 wherein:

the plurality of video games represents a sports contest; and the moving object is player who moves about during the sports contest.

16. The CS of claim 13 wherein:

the performance of object tracking calibration includes determining locations of the moving object by detecting the bounding boxes.

17. The CS of claim 13 wherein the computer code further includes data and instructions for performing the following operation(s):

determining key frames of the plurality of video frames with the key frames being frames where a location change in a location of the moving object is relatively large;

wherein the performance of object detection includes applying an object detection algorithm on at least some of the video frames of the plurality of video frames to locate the moving object within the video frames.

18. The CS of claim 13 wherein a sampled frame object location, used as an object tracking location for a given video frame, is the lagging detection result.

* * * * *